United States Patent [19]

Agostini

[11] Patent Number: 4,767,151

[45] Date of Patent: Aug. 30, 1988

[54] DEVICE TO ALLOW AN AUTOMOBILE SUN VISOR TO ACT AS AN AIR DEFLECTOR

[76] Inventor: Robert Agostini, 409 Baker St., Old Forge, Pa. 18518

[21] Appl. No.: 108,123

[22] Filed: Oct. 14, 1987

[51] Int. Cl.⁴ .................................................. B60J 3/00
[52] U.S. Cl. ..................................... 296/97 K; 248/301; 248/316.7
[58] Field of Search ............... 248/300, 301, 231.8, 248/215, 316.7; 296/97 R, 217, 97 K

[56] References Cited

U.S. PATENT DOCUMENTS

| 1,331,525 | 2/1920 | Pratt | 248/227 X |
| 2,156,872 | 5/1939 | Roberts | 248/300 X |
| 2,436,533 | 2/1948 | Thompson | 248/301 |
| 2,483,838 | 10/1949 | Nichol | 248/300 X |
| 2,752,709 | 7/1956 | Gougl | 248/231.8 X |
| 2,811,328 | 10/1957 | Ericson | 248/301 X |

Primary Examiner—Alvin C. Chin-Shue
Attorney, Agent, or Firm—Michael J. Delaney

[57] ABSTRACT

A device for holding a sun visor of an open top automobile in an upwardly extending position to allow the sun visor to act as an air deflector comprises a one piece clip member having integrally connected first, second and third leg members which form a triangle. The sun visor extends within the triangle and the free end of the first leg member is removably secured to the top of the automobile windshield.

3 Claims, 2 Drawing Sheets

DEVICE TO ALLOW AN AUTOMOBILE SUN VISOR TO ACT AS AN AIR DEFLECTOR

BACKGROUND OF THE INVENTION

This invention relates to an air deflector for an open top automobile and in particular to a clip member which fastens to the sun visor of an automobile and holds the sun visor in an upwardly extending position to allow the sun visor to act as an air deflector.

Some of the present day automobiles allow the top or a portion of the top of the automobile to be removed or lowered such that the top or a portion of the top is open. In driving such an automobile the air passes over the top of the windshield and is deflected backwardly and downwardly into the passenger compartment of the automobile. The amount of air which is so deflected is, for the most part, a function of the speed of the automobile. The higher the speed, the more air tends to be deflected into the passenger compartment. On the other hand in some instances, there is a certain speed at which the most air is so deflected and that speed may not be the highest speed of the automobile. When air is deflected into the passenger compartment, a considerable amount of noise and vibration takes place due to air turbulence. This is particularly true when the side windows of the automobile are in the up position. It has been found that the problem of noise and vibration is particularly noticeable in an open top 1984 Chevrolet Corvette and similarly designed open top automobiles.

Many attempts have been made to eliminate the problem of noise and vibration referred to above. Such attempts include air foil sections which may or may not extend and retract from and to an operable position.

For the most part the attempts to solve the noise and vibration problem due to air turbulence in an open top automobile have involved devices which are complicated and expensive to install and/or maintain.

SUMMARY OF THE INVENTION

It is an object of this invention to provide an inexpensive device to reduce noise and vibration due to air turbulence in an open top automobile.

It is another object of this invention to provide a simple, practical solution to the problem caused by air turbulence in an open top automobile.

The above objects can be accomplished by the device of this invention which holds the sun visor of the automobile in an upwardly position during driving and allows the sun visor to act as an air deflector to prevent a substantial portion of the air from passing back into the passenger compartment and creating turbulent air currents with the attendant noise and vibration.

The device is a one piece clip member which encircles the sun visor, is secured adjacent the top of the windshield and is sized to hold the sun visor in an upwardly extending position.

DETAILED DESCRIPTION OF THE DRAWINGS

Figure 1:
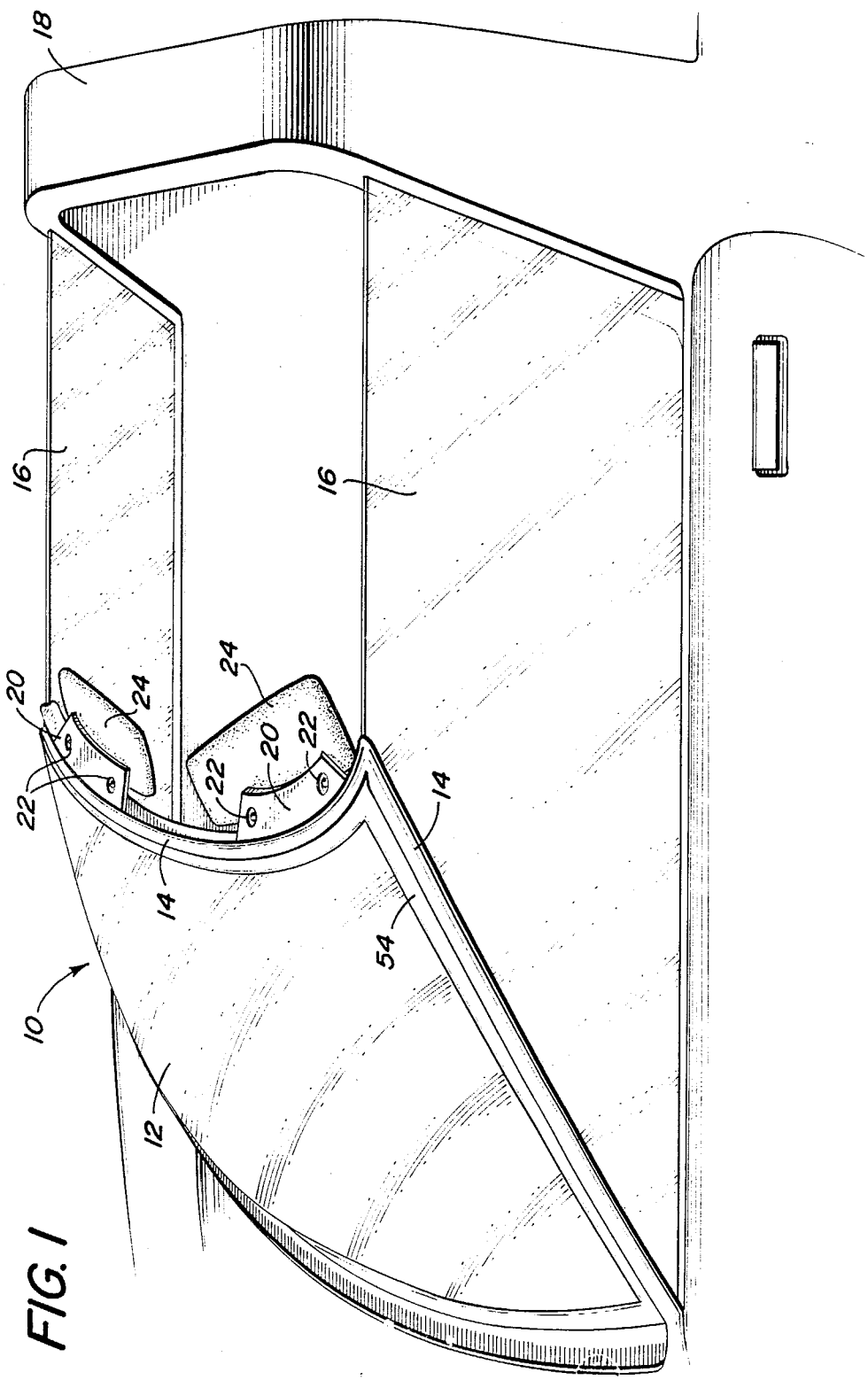
FIG. 1 is a perspective view of the upper portion of an open top automobile.
Figure 3:
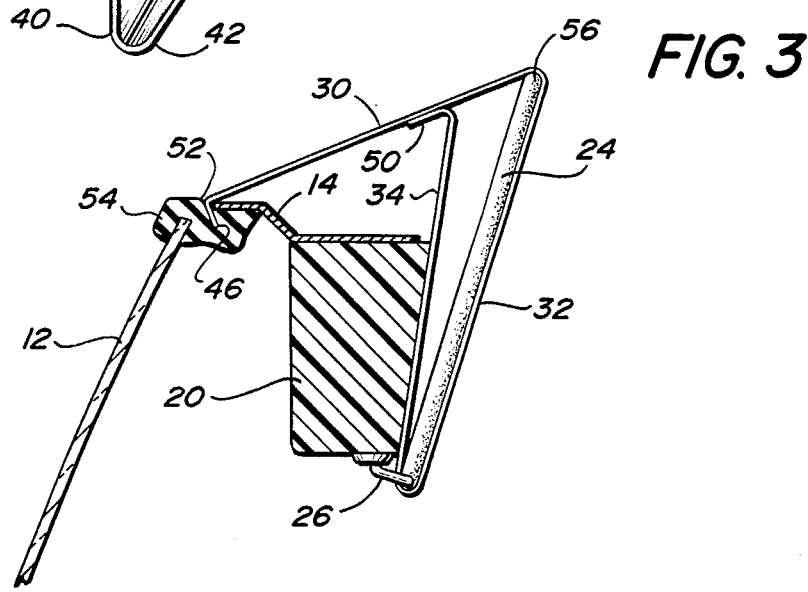
FIG. 3 is a cross sectional view of the windshield and sun visor mounting pad and showing the sun visor held in an upwardly position by the device of this invention.

In FIG. 1, 10 refers generally to an open top automobile having a windshield 12 mounted in a frame 14, side windows 16 and a rear roll bar member 18. Attached to the windshield frame 14 are a pair of mounting members 20 which include openings 22 to receive holding pins (not shown) of a removable top (not shown). Pivotally attached to each mounting member 20 is a sun visor 24. As best shown in FIG. 3, the sun visor 24 is capable of movement in a vertical plane about pivot arm 26 which is rotatably attached to mounting member 20.

Figure 2:
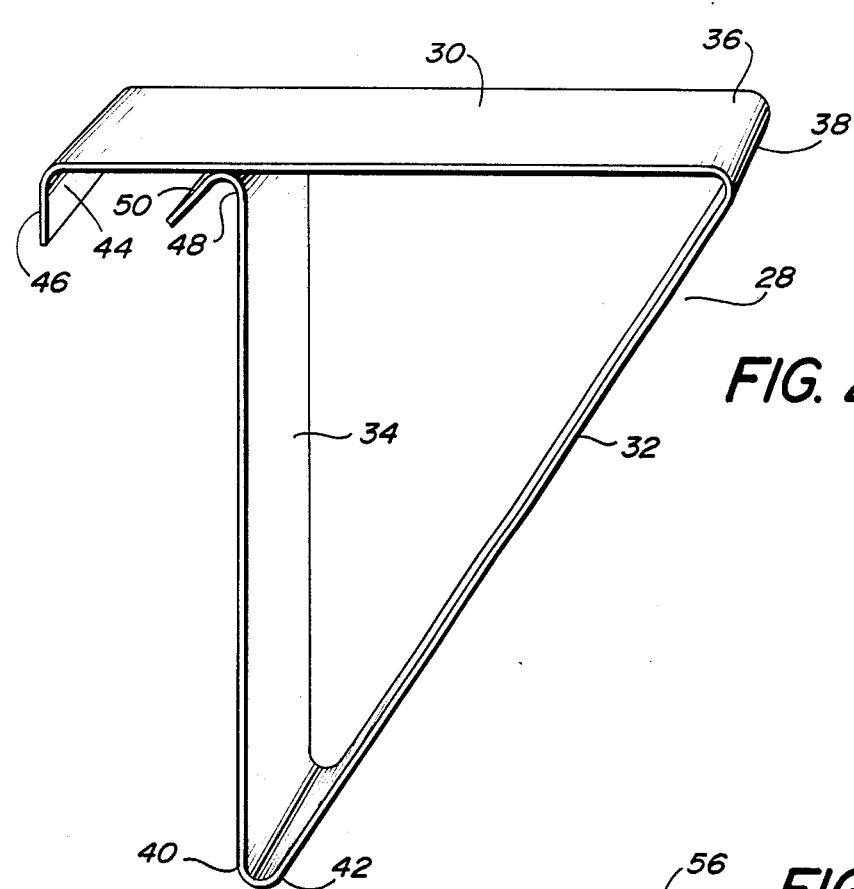
FIG. 2 is a perspective view of the device of this invention.

Referring to FIG. 2, the device of this invention comprises a one piece clip member 28 having a first elongated leg member 30, a second elongated leg member 32 and a third elongated leg member 34. One end 36 of the first leg member 30 is integrally connected to one end 38 of second leg member 32 and one end 40 of third leg member 34 is integrally connected to the other end 42 of second leg member 32. The third leg member 34, second leg member 32 and a portion of first leg member 30 form a triangle. The free end 44 of first leg member 30 includes a portion which is bent towards third leg member 34 to form a hook 46. The free end 48 of third leg member 34 includes a portion 50 which is bent at an acute angle back towards the third leg member 34.

Referring to FIG. 3, the one piece clip member 28 is positioned such that the sun visor 24 extends within the triangle formed by the leg members 30, 32, 34, and the bent portion or hook 46 of first leg member 30 is secured or anchored in a slot 52 in the rubber weather strip 54 which surrounds the windshield 12 and is secured to the frame 14 of the windshield 12. The length of first leg member 30 is such that it extends from the top 56 of the sun visor 24 which is in the upright position to the windshield frame 14 and allows the hook 46 to be secured adjacent the top of the windshield 12. When the clip 28 is so positioned to hold the sun visor 24 in the upright position, the third leg member 34 is forced towards the second leg member 32, and the second leg member 332 is in contact with the sun visor 24, with the first leg member 30.

It has been found that a clip member 28 made from sheet steel having a thickness of about 1/32 of an inch and having the following dimensions performed satisfactorily to hold the sun visor of an open top 1984 Chevrolet Corvette in the upright position during driving and all but eliminated noise and vibration due to air turbulence.

Width of clip member 28 = 1¼ inches.
Length of first leg member 30 = 5 inches.
Length of second leg member 32 = 5⅜ inches.
Length of third leg member 34 = 5 inches.
Length of hook 46 = 1½ inches.
Angle of hook 46 relative to first leg member 30 = 90 degrees.
Length of bent portion 50 relative to third leg member 34 = 1¼ inches.
Angle of bent portion 50 relative to third leg member 34 = 55 degrees.

A clip member 28 made with the above dimensions and from the above material possessed the proper configurations and resilience to hold the sun visor of a 1984 Chevrolet Corvette in the upright position during driving at all speeds. When held in such position the sun visor acted as an air deflector and considerably reduced the sun visor acted as an air deflector and considerably reduced the noise and vibration due to air turbulence in the passenger compartment of the automobile with the side windows in the up position.

Although I have described my invention hereinabove in considerable detail, I do not wish to be limited narrowly to the exact and specific particulars disclosed, but may use such substitutes, modifications and equivalents as are included within the scope of my invention or pointed out in the appended claims.

I claim:

1. In combination, a sun visor of an open top automobile having a windshield, and rotatable in a vertical plane and a device holding said sun visor in an upwardly extending position, said combination comprising:
   a. a one piece clip member having a first elongated leg member, a second elongated leg member and a third elongated leg member,
   b. said first leg member having one of its ends integrally connected to one end of said second leg member, and said third leg member having one of its ends integrally connected to the other end of said second leg member,
   c. said third leg member, said second leg member and a portion of said first leg member form a triangle,
   d. the free end of said first leg member includes a portion which is bent towards said third leg member to form a hook,
   e. the free end of said third leg member contacts said first leg member and is bent at an acute angle to said third leg member,
   f. said sun visor extends within said triangle and is in contact with said second leg member, and
   g. said hook on said free end of said first leg member is removably secured adjacent the top of the automobile windshield in a slot of a strip means attached to said windshield, whereby said sun visor acts as an air deflector to substantially reduce noise and vibration due to air turbulence when said automobile is driven.

2. The device of claim 1 wherein said first leg member has a length of about 5 inches, said second leg member has a length of about 5⅜ inches and said third leg member has a length of about 5 inches.

3. The device of claim 2 wherein said clip member is made from sheet steel.

* * * * *